United States Patent
Pei et al.

(10) Patent No.: US 9,080,426 B2
(45) Date of Patent: Jul. 14, 2015

(54) ANTI-CHANNELING PACK-OFF PARTICLES USED IN A PRODUCTION SECTION OF AN OIL-GAS WELL, AND COMPLETION METHOD AND PRODUCTION METHOD USING SUCH PARTICLES

(75) Inventors: Bailin Pei, Beijing (CN); Feng Zhang, Beijing (CN)

(73) Assignee: ANTON BAILIN OILFIELD TECHNOLOGIES (BEIJING) CO., LTD, Beijing (CN)

( * ) Notice: Subject to any disclaimer, the term of this patent is extended or adjusted under 35 U.S.C. 154(b) by 289 days.

(21) Appl. No.: 13/514,494

(22) PCT Filed: Dec. 10, 2010

(86) PCT No.: PCT/CN2010/002014
§ 371 (c)(1),
(2), (4) Date: Jun. 19, 2012

(87) PCT Pub. No.: WO2011/069339
PCT Pub. Date: Jun. 16, 2011

(65) Prior Publication Data
US 2012/0247762 A1    Oct. 4, 2012

(30) Foreign Application Priority Data
Dec. 11, 2009 (CN) .......................... 2009 1 0250791

(51) Int. Cl.
*E21B 33/13* (2006.01)
*E21B 43/04* (2006.01)
(Continued)

(52) U.S. Cl.
CPC .................. *E21B 43/04* (2013.01); *C08L 23/06* (2013.01); *C09K 8/508* (2013.01); *C09K 8/516* (2013.01);
(Continued)

(58) Field of Classification Search
CPC ......... E21B 43/02; E21B 33/13; E21B 43/04; C09K 8/56
USPC ......................................... 166/278, 280.2, 51
See application file for complete search history.

(56) References Cited

U.S. PATENT DOCUMENTS 1,379,815 A    5/1921    Hall
2,018,283 A    10/1935   Schweitzer et al.
(Continued)

FOREIGN PATENT DOCUMENTS

CN    1510249 A    7/2004
CN    1906376 A    1/2007
(Continued)

*Primary Examiner* — Brad Harcourt
(74) *Attorney, Agent, or Firm* — Fitzpatrick, Cella, Harper & Scinto

(57) ABSTRACT

Anti-channeling pack-off particles used in a production section of an oil-gas well, a completion method, and a production method are provided. The anti-channeling pack-off particles are macromolecule polymer particles having an average particle diameter of 0.05-1.0 mm and a real density of 0.8-1.4 g/cm$^3$. The particles are compactly filled into a space of the oil-gas well, which is required to be filled and packed off so that there is no channeling path after filling, thus effectively pack-off or sectioning the oil-gas well into multiple, relatively independent regions for production from the oil-gas well, and thus improving the production efficiency of the oil-gas well. Even if a channeling path occurs, a very small flow of channeling fluid of a carrier medium will move some of the anti-channeling pack-off particles in a direction towards the channeling path and accumulate those particles until the channeling path is filled, thereby achieving favorable effects of anti-channeling, packing-off, and sectional flow control.

6 Claims, 1 Drawing Sheet

(51) Int. Cl.
    *C08L 23/06* (2006.01)
    *C09K 8/508* (2006.01)
    *C09K 8/516* (2006.01)

(52) U.S. Cl.
    CPC ....... *C08L 2207/062* (2013.01); *C08L 2312/00* (2013.01); *E21B 33/13* (2013.01); *Y10T 428/2982* (2015.01)

(56) References Cited

U.S. PATENT DOCUMENTS

| | | | |
|---|---|---|---|
| 3,460,616 | A | 8/1969 | Tucker et al. |
| 4,733,729 | A | 3/1988 | Copeland ...................... 166/276 |
| 4,793,411 | A | 12/1988 | Zunkel ............................ 166/98 |
| 5,404,951 | A | 4/1995 | Lai et al. ....................... 166/295 |
| 5,623,993 | A | 4/1997 | Van Buskirk et al. ......... 166/292 |
| 5,913,365 | A | 6/1999 | Bryant ........................... 166/311 |
| 7,527,095 | B2 | 5/2009 | Bloess et al. ................... 166/265 |
| 2003/0075315 | A1 | 4/2003 | Nguyen et al. ................... 166/51 |
| 2007/0144736 | A1* | 6/2007 | Shinbach et al. ........... 166/250.1 |
| 2008/0041588 | A1* | 2/2008 | Richards et al. .............. 166/265 |
| 2008/0142222 | A1 | 6/2008 | Howard et al. ............... 166/295 |
| 2008/0230223 | A1* | 9/2008 | McCrary et al. ............ 166/272.2 |
| 2012/0279716 | A1 | 11/2012 | Pei et al. ........................ 166/311 |

FOREIGN PATENT DOCUMENTS

| | | |
|---|---|---|
| CN | 1918361 A | 2/2007 |
| CN | 101338660 A | 1/2009 |
| CN | 101701517 A | 5/2010 |
| CN | 101705802 A | 5/2010 |
| CN | 101705808 A | 5/2010 |
| CN | 101705809 A | 5/2010 |
| CN | 101705810 A | 5/2010 |
| GB | 2 269 840 A | 2/1994 |
| WO | WO 2005/078235 A1 | 8/2005 |

* cited by examiner

ANTI-CHANNELING PACK-OFF PARTICLES USED IN A PRODUCTION SECTION OF AN OIL-GAS WELL, AND COMPLETION METHOD AND PRODUCTION METHOD USING SUCH PARTICLES

TECHNICAL FIELD

The present invention relates to the oil and natural gas exploitation field, and specifically relates to anti-channeling pack-off particles used in a production section of an oil-gas well and, completion method and production method using such anti-channeling pack-off particles. The oil-gas well here refers to a production well in a broader sense in oil-gas field development, which includes an oil well, a gas well, a natural gas well, an injection well, etc.

BACKGROUND ART

In the production process of an oil-gas well, due to such causes as non-homogenous characteristics of an oil reservoir, both a vertical well and a horizontal well require packing off the oil-gas well into multiple relatively independent regions for production. The oil-gas well production here includes fluid output and injection in the production process of an oil-gas well, such as oil exploitation, or such operations as performing acidification by injecting acid fluid into the formation through an oil-gas well.

The production by packing off an oil-gas well into multiple relatively independent regions usually uses packers to separate a production section of an oil-gas well into independent flow units along the axis of an oil-gas well, each of the flow units being installed with a device for flow control. For example, the device for flow control may be a flow-control filter or the like.

Having been long dedicated to research on flow control and packing off in a production section of an oil-gas well, the applicant has discovered many problems existing in the use of a packer. The applicant applied for a patent for invention, Application No. 02158107.X filed on Dec. 23, 2002, the invention title of which is "COMPLETION SYSTEM OF OIL AND GAS WELLS WITH REGULATABLY CONTROLLING FLOWS OF FORMATION FLUID OR FILLED FLUID IN SUB-DIVIDED SECTIONS" (explanation: the patent applicant is Beijing Hinen-Hitech Petroleum Technology Development Co., Ltd, which company at present has been incorporated into ANTON OILFIELD SERVICES (GROUP) LTD.). The patent application analyzes defects of traditional packers in detail and, on such basis, discloses a completion system of oil and gas wells with regulatably controlling flows of formation fluid or injection fluid in sub-divided sections. The completion system at least includes a flow control string and a porous medium inside an oil-gas well, wherein the flow control string is a filter having a flow regulating and controlling device. The porous medium is provided in an annular space formed by the outer wall of the flow control string and the borehole wall. The flow control filter is provided with flow collecting holes and a flow collecting cavity (the flow collecting cavity is also called as a flow diverting layer) inside which the flow collecting holes are disposed for flowing of a formation fluid or injection fluid inside and outside the flow control filter. A flow regulating and controlling device is provided inside the flow collecting hole for regulating and controlling passage of a formation fluid or injection fluid through the flow collecting hole. The invention is used to regulate and control flow states of fixed sections at different positions of an oil reservoir. Compared with traditional packers, the number of pack-off sections may be increased significantly, with the pack-off sections being divided. The control precision of such downhole productions are improved for layered injection and production, testing, plugging and profile modification. In particular, the invention is adapted to development of a non-homogenous reservoir or a multilayer oil reservoir and other circumstances requiring sub-division of downhole sections for flow regulation and control.

The porous medium of the patent application, which is filled in a space between the flow control filter and the borehole wall, produces the anti-channeling effect of fluid in an axial direction, thereby in other words producing a pack-off effect to a certain extent, i.e. the porous medium is the anti-channeling pack-off particles used in a production section of an oil-gas well set forth by us at present.

The patent application further discloses that the porous medium is a loose medium, a non-loose porous medium or a combination thereof. The loose medium is formed by piling formation sands, gravel particles, ceramsites, plastic particles or a combination thereof. The non-loose porous medium is a fiber, a particle cementation, a consolidated porous cement, a porous plastic or a cementation medium formed by a combination thereof. The porous medium has a permeability rate of 300 $\mu m^2$-$10^{-5}$ $\mu m^2$.

As a matter of fact, the patent application only puts forward a conceptual solution for selection of a porous medium but fails to take a specific option, and such can also be seen from three embodiments of the patent. Especially, although the patent application mentions that plastic particles and porous plastics may serve as a porous medium, because of various categories of plastics and significant differences in their properties, the patent application fails to mention whether the plastics machining process can satisfy the requirements of an oil-gas well for the anti-channeling pack-off particles used in a production section, and the like.

The applicant applied for a new patent application, Application No. 200810118109.X filed on Aug. 12, 2008, the title of which is "HORIZONTAL PRODUCTION-INJECTION WELL COMPLETION STRUCTURE POSSESSING FLOW CONTROL FUNCTION". The patent application summarizes the experiments carried out by the applicant from the year of 2002 to 2008, and analyzes defects of an annular packer in the prior horizontal wells and the defects of taking sand or ceramsites as an anti-channeling pack-off medium in detail as follows: Because sand or ceramsites have a high density, due to a flow limiting effect of the flow-controlling device in a horizontal production-injection well, there are problems of small filling flow, difficulty of sand or ceramsites filling, and loose filling, thus making it impossible to achieve the purpose of preventing axial channeling of water or gas.

The patent application discloses a completion structure of a horizontal injection-production well with flow control function. The structure is comprises a borehole wall and a flow control filter. The borehole wall includes a vertical section and a horizontal section, with the flow control filter being located in a horizontal section of the borehole wall and being fixedly connected with the borehole wall. A cavity between the flow control filter and the borehole wall is filled with glassy hollow particles. The glassy hollow particles as defined in the patent application are anti-channeling pack-off media for use in an oil-gas well, and the patent further discloses that the glassy hollow particles have a compaction percentage of 80% to 100%. The glassy hollow particles are hollow beads in coal ash formed after burning or artificial hollow glassy balls. The glassy hollow particles have a density of 0.5-1.8 g/cm³. The glassy hollow particles have a particle diameter of 30 μm-1000 μm.

As the anti-channeling pack-off particles have high requirements for the density and particle diameter, the cost of the artificial hollow glassy balls is so high that it is difficult to be applied in practice. Consequently, the present applicant has sequentially carried out a quantity of experiments on using hollow beads in coal ash as a pack-off medium, through which experiments it was discovered that there still exists the following problems when hollow beads in coal ash are used as the pack-off medium:

1. The hollow beads have an actual density of mostly about 0.6 g/cm³, which has a difference of about 0.4 from the density of water at 1 g/cm³. As the flow control filter limits the flow to such a small amount to cause the pressure of water stream carrying the hollow bead to be too weak, it is still impossible to satisfy the requirements of filling up with hollow beads in most cases.

2. The hollow beads have such a poor pressure resistance that about 50% of the hollow beads will be broken when pressurized. Also, the specific gravity of the broken hollow bead is significantly increased so that such broken hollow bead may severely affect the anti-channeling pack-off effect in a production section of an oil-gas well.

3. If the pressure resistance of a hollow bead is required to reach the requirements, the particle diameter of the hollow bead will be too small to be found in reality and thus it is difficult to satisfy the requirements in most cases.

To validate the aforementioned solution, the applicant has established an appropriate experimental apparatus and uses many media to carry out a experiment for filling and packing off, for instance using quartz sand and the like to carry out a experiment for filling and packing off. In the experimental process, the applicant discovered that, due to a flow limiting effect of a flow control device, such particles as quartz sand are filled so loose as to form a major vacancy and channeling.

A desirable material is required to withstand the downhole high temperature, high pressure and high strength extrusion force. A desirable material is further required to be resistant to oil and water, in many circumstances is also required to be resistant to strong acid, and moreover is additionally required to be stable over several years or a decade. Moreover, it is also necessary for the materials to have a particle diameter in order to achieve the requirements. Over many years, the applicant has long endeavored persistently with experiments to prove that most plastics do not satisfy the requirements of an oil-gas well for anti-channeling pack-off medium.

Owing to the production characteristics, an oil-gas well has other strict requirements for a pack-off medium. On the one hand, the pack-off medium should not plug an oil-gas well; otherwise, it may cause the oil-gas well to be discarded due to no production-fluid. On the other hand, the permeability of the pack-off medium should be neither too high nor too low, such that it is possible to reach a small radial resistance and a large axial resistance so as to achieve the purpose of blocking an axial flow of formation fluid or injection fluid in the oil-gas well, and at the same time allowing a radial penetration of formation fluid or injection fluid in an oil-gas well. Such requirements necessitate the particle diameter to be within a required range.

SUMMARY OF THE INVENTION

The technical problem that the present invention aims to solve is to overcome the defects existing in the prior packers or anti-channeling pack-off particles used in a production section, and to provide a kind of anti-channeling pack-off particles that can be used in a production section of an oil-gas well in the presence of a flow control filter in an oil-gas well. Filling by the particles may be by a particle carrier fluid carrying the particles to a space to be packed off and compactly filled with hardly a channeling path. In combination with the flow control filter, the particles may effectively pack off an oil-gas well into multiple relatively independent regions for production of the oil-gas well, thus achieving the purpose of sectional flow control, facilitating sectional flow management and bringing a favorable effect for production of an oil-gas well, e.g. improving the production efficiency of the oil-gas well. Furthermore, even if there is a channeling path, a very small flow of fluid channeling in production will move the anti-channeling pack-off particles towards the direction of the channeling path and accumulate the particles so as to block the channeling path, thereby achieving a favorable flow control and anti-channeling pack-off effect.

Hereby, the applicant puts forward such a solution that particle materials with a density close to that of a common carrier fluid is used as anti-channeling pack-off particles so as to achieve the purpose of solving the aforementioned problems. Such an anti-channeling pack-off medium will easily realize the pack-off purpose when the anti-channeling pack-off medium and the carrier medium have characteristics such as a close density.

In order to solve the aforementioned problem, the present invention provides the following technical solution:

The present invention relates to anti-channeling pack-off particles used in a production section of an oil-gas well, which anti-channeling pack-off particles are macromolecule polymer particles having an average particle diameter of 0.05-1.0 mm and a real density of 0.8-1.4 g/cm³.

Preferably, the anti-channeling pack-off particles are macromolecule polymer particles having an average particle diameter of 0.1-0.5 mm and a real density of 0.94-1.06 g/cm³.

Preferably, the anti-channeling pack-off particles are polyethylene particles having an average particle diameter of 0.1-0.5 mm and a real density of 0.90-0.98 g/cm³.

More preferably, the polyethylene is a high-density polyethylene.

Alternatively, the anti-channeling pack-off particles are styrene and divinylbenzene cross-linked copolymer particles having an average particle diameter of 0.05-1.0 mm and a real density of 0.96-1.06 g/cm³.

Alternatively, the anti-channeling pack-off particles are polypropylene and PVC macromolecule polymer particles having an average particle diameter of 0.05-1.0 mm and a real density of 0.8-1.2 g/cm³.

Preferably, the particles are spherical particles.

The present invention further relates to a completion method for an oil-gas well, the method comprising the following steps: (1) running a flow control filter string into a production section of a drilled hole; (2) filling an annulus radially exterior to the flow-control filter string with anti-channeling pack-off particles, the anti-channeling pack-off particles being macromolecule polymer particles having an average particle diameter of 0.05-1.0 mm and a real density of 0.8-1.4 g/cm³.

Further, the present invention also relates to a production method, the method comprising the following steps: (1) drilling a hole in a formation; (2) running a flow-control filter string into a production section of a drilled hole; (3) filling an annulus radially exterior to the flow-control filter string with anti-channeling pack-off particles; (4) producing or injecting fluid in the completion that is formed, the anti-channeling pack-off particles being macromolecule polymer particles having an average particle diameter of 0.05-1.0 mm and a real density of 0.8-1.4 $g/cm^3$.

The density of the particles as defined in the present invention is a real density of particles rather than accumulation density of particles.

The carrier medium in an oil-gas well is generally water or a water solution, in which the density of water is 1 $g/cm^3$. The density of a water solution used in an oil-gas well is also generally about 1 $g/cm^3$. Thus, the present invention chooses the anti-channeling pack-off particles having a density close to that of water or a water solution, which particles are carried by water or the water solution to a space of an oil-gas well to be filled and packed off and compactly filled to result in hardly a channeling path. The particles in combination with a flow control filter may effectively pack off an oil-gas well into multiple relatively independent regions for production of the oil-gas well, thus achieving the purpose of sectional flow control, facilitating sectional flow management and bringing a favorable effect for production of an oil-gas well, e.g. improving the production efficiency of the oil-gas well. In the filling process, part of water returns to the ground surface through the flow control filter while part of water penetrates the formation such that the anti-channeling pack-off particles accumulate up the channeling path to produce a favorable anti-channeling and pack-off effect.

Furthermore, even if there is a channeling path after production, a very small flow of axial channeling fluid will move the anti-channeling pack-off particles towards the direction of the channeling path and accumulate the particles and block the channeling path. This, in combination with a flow control filter achieves the purpose of flow control production of an oil-gas well.

The anti-channeling pack-off particles, which are filled in an annulus radially exterior to the flow control filter string allow fluid to penetrate radially along an oil-gas well. The flow of fluid in the anti-channeling pack-off particles is a penetration. According to the principles of fluid mechanics in porous medium, the amount of a penetration resistance is in direct proportion to a penetration path and in an inverse proportion to a penetration area. As the construction filled by the anti-channeling pack-off particles is in an elongate cylindrical shape, the construction has a small thickness, a small cross section and a large axial length so that the formation fluid passing through the anti-channeling pack-off particles is subject to a great flow resistance for axial anti-channeling in an oil-gas well, while the formation fluid passing through the anti-channeling pack-off particles is subject to a weak radial flow resistance along an oil-gas well since it passes through a large area of radially flowing fluid, and a short distance. The flow resistance for axially flowing fluid along an oil-gas well for some meters to some tens of meters is some hundred times and even some thousand times the flow resistance for radially flowing fluid along an oil-gas well for some centimeters. The significant difference between the flow resistance for axially flowing fluid along an oil-gas well and that for radially flowing fluid along an oil-gas well results in the flow rate for axially flowing fluid along an oil-gas well being far smaller than the flow rate for radially flowing fluid along an oil-gas well at the same pressure difference. Such utilization of the difference between the axial and radial flow resistance of the anti-channeling pack-off particles can both ensure a smooth radial flow of fluid along an oil-gas well and limit an axial flow of fluid along an oil-gas well, thereby producing the anti-channeling and pack-off effect, and achieving the purpose of sectional flow-control production.

The anti-channeling pack-off particles used in a production section of an oil-gas well as defined in the present invention, which can be applied both in a horizontal well and in a vertical well or a deviated well, can be filled both in an annulus outside a downhole flow control filter and in a space communicating with the annulus outside a downhole flow control filter, thereby producing the anti-channeling and pack-off effect and achieving the purpose of sectional flow control production by cooperating with a flow control filter.

DETAILED DESCRIPTION OF PREFERRED EMBODIMENTS

Embodiment 1

The present invention relates to one kind of anti-channeling pack-off particles used in a production section of an oil-gas well. The anti-channeling pack-off particles are high density polyethylene particles having an average particle diameter of 0.10-0.15 mm and a density of 0.92-0.96 $g/cm^3$.

Embodiment 2

The present invention relates to one kind of anti-channeling pack-off particles used in a production section of an oil-gas well. The anti-channeling pack-off particles are polypropylene and PVC macromolecule polymer spherical particles having an average particle diameter of 0.05-0.10 mm and a density of 0.97-1.10 $g/cm^3$.

Embodiment 3

The present invention relates to one kind of anti-channeling pack-off particles used in a production section of an oil-gas well. The anti-channeling pack-off particles are polypropylene and butadiene polymer spherical particles having an average particle diameter of 0.3-0.7 mm and a density of 1.0-1.08 $g/cm^3$.

Embodiment 4

The present invention relates to one kind of anti-channeling pack-off particles in a production section of an oil-gas well. The anti-channeling pack-off particles are polypropylene and butadiene polymer spherical particles having an average particle diameter of 0.3-0.5 mm and a density of 1.2 $g/cm^3$.

Embodiment 5

The present invention relates to one kind of anti-channeling pack-off particles in a production section of an oil-gas well. The anti-channeling pack-off particles are styrene and divinylbenzene cross-linked copolymer particles having an average particle diameter of 0.3-0.5 mm and a density of 0.96-1.06 $g/cm^3$.

Embodiment 6 (One Example for Application)

Figure 1:
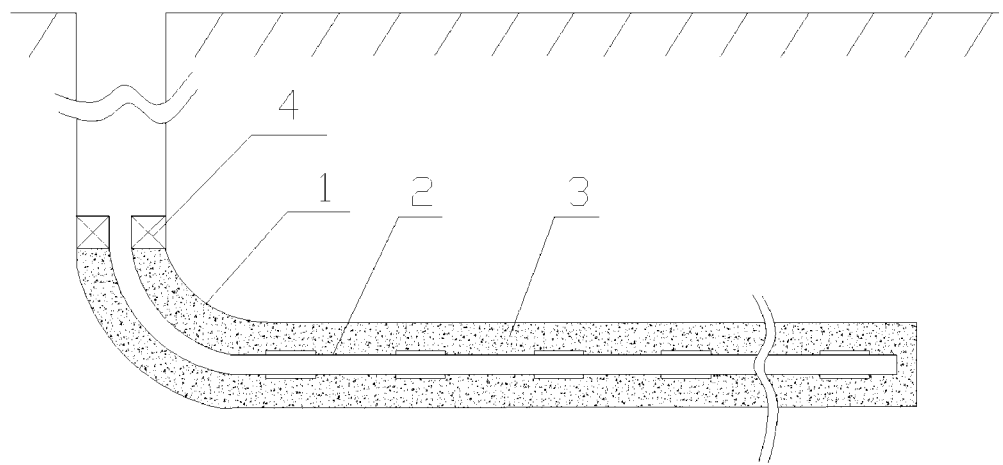
FIG. 1 is a structural view of a completion structure of a horizontal well, which uses the anti-channeling pack-off particles in a production section of an oil-gas well as defined in the present invention.

FIG. 1 illustrates an overall structural view of a completion system of an oil-gas well with regulatably controlling flows of formation fluid or injection fluid in sub-divided sections. In the system, high density polyethylene particles as defined in Embodiment 1 of the present invention are applied for packing off.

As shown in FIG. 1, the completion system comprises a borehole wall 1, a flow control filter string 2 and a hold-down packer 4 for hanging the flow control filter string. First, the flow control filter string is run to a downhole production section. An annulus is formed between the borehole wall and the flow control filter string. Then, the high density polyethylene particles, as defined in Embodiment 1, are carried by water or a water solution to the annulus outside the flow control filter string for accumulation. Part of the water flowing passing through the flow control filter string will flow to the ground surface while part of the water will penetrate into the formation. The high density polyethylene particles form a relatively compact anti-channeling pack-off particles ring 3 in the annulus formed between the borehole wall and the flow control filter string. Then, the hold-down packer is set to prevent the particles from flowing out along with fluid flow during production. The anti-channeling pack-off particle ring 3 is used to block axial flow of the formation fluid or the injection fluid in the annular space along the oil-gas well, and at the same time allow radial penetration of the formation fluid or injection fluid along the oil-gas well. The filter string refers to a string connected by one or more than one filters in series.

Figure 2:
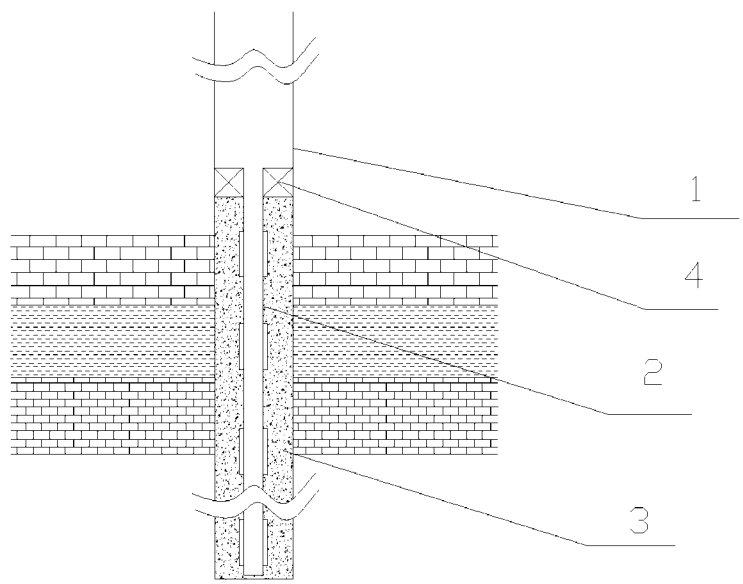
FIG. 2 is a structural view of a completion structure of a vertical well, which uses the anti-channeling pack-off particles in a production section of an oil-gas well as defined in the present invention.

Likewise, the anti-channeling pack-off particles used in a production section of an oil-gas well according to the present invention may also be applied in a vertical well as shown in FIG. 2, or a deviated well. In FIG. 2, the reference sign 1 indicates a borehole wall, the reference sign 2 indicates a flow control filter string, the reference sign 4 indicates a hold-down packer for hanging a flow control filter string, and the reference sign 3 indicates the ring of the anti-channeling pack-off particles filled in an annulus between the borehole wall and the flow control filter string.

The present applicant has exposed the problems through a large amount of experiments, has found a method for solving the problems, has validated the effects of the solution, and has realized the production requirements. The experimentation of the present applicant is an arduous and long course, and the applicant has endeavored persistently ever since year 2002. The problems encountered by the applicant in the course of experimentation are not well-known problems and the feasible methods found are also not well-known methods. At present, the applicant is the only one domestically and abroad who is doing this and has always insisted on a study in this regard, aiming to seek for optimum anti-channeling pack-off particles in a production section of an oil-gas well.

The production section as defined in the present invention is a production section in a broader sense, and there may exist non-flowing sections in the length range of the production section, such as an interlayer, a sandwich layer and imperforated sections of a casing cementation well.

The flow control string filter as defined in the present invention includes filtering sections and blank sections that alternate with each other. The blank sections are tubes with no holes on walls. The rings of anti-channeling pack-off particles outside the blank sections produce the main effect of axial anti-channeling. The blank sections are provided in two ways. In one circumstance, as a matter of fact, each filter has filtering sections and blank sections, and the blank sections, which are on both ends of the filter and provided with threads, are the place for being clamped by a pincer when a filter is screwed above the well. In the other circumstance, the blank sections are joined between two filters. In a circumstance in which the flow control filter string is quite long, the flow control filter string is connected by a plurality of flow control filters in series.

The anti-channeling pack-off particles as defined in the present invention are preferably spherical.

Finally, it is imperative to understand that the aforementioned embodiments only pertain to exemplifications made to clearly illustrate the present invention rather than definitions of the embodiments. On the basis of the descriptions, a person skilled in the art may also make changes or variations of other different forms. It is thus unnecessary and impossible to list all the embodiments; however, the obvious changes or variations deriving therefrom still fall into the protection scope of the present invention.

What is claimed is:

1. A completion system of an oil-gas well for controlling a flow of a formation fluid or an injection fluid in a sub-divided section of the oil-gas well, the system comprising:
   a flow control filter string; and
   anti-channeling pack-off particles,
   wherein the flow control filter string is a filter that includes a flow regulating and controlling device,
   wherein the anti-channeling pack-off particles are provided in an annular space formed by an outer wall of the flow control filter string and a wall of the oil-gas well such that, when the flow control filter string is used to control the flow of the formation fluid or the injection fluid, the anti-channeling pack-off particles permit the formation fluid or the injection fluid to flow radially along the oil-gas well while limiting an axial flow of the formation fluid or the injection fluid along the oil-gas well, and
   wherein the anti-channeling pack-off particles are styrene and divinylbenzene cross-linked copolymer particles, which have an average particle diameter of 0.05-1.0 mm and a real density of 0.96-1.06 g/cm$^3$.

2. The completion system according to claim 1, wherein the anti-channeling pack-off particles are spherical particles.

3. A completion method for an oil-gas well, the method comprising steps of:
   installing a flow-control filter string into a production section of a drilled hole, the flow-control filter string being a filter that includes a flow regulating and controlling device; and
   filling an annulus radially exterior to the flow-control filter string with anti-channeling pack-off particles, the annulus being located between an outer wall of the flow-control filter string and a wall of the oil-gas well,
   wherein, when the flow-control filter string is used to control a flow of a formation fluid or an injection fluid, the anti-channeling pack-off particles permit the formation fluid or the injection fluid to flow radially along the oil-gas well while limiting an axial flow of the formation fluid or the injection fluid along the oil-gas well, and
   wherein the anti-channeling pack-off particles are are styrene and divinylbenzene cross-linked copolymer particles, which have an average particle diameter of 0.05-1.0 mm and a real density of 0.96-1.06 g/cm$^3$.

4. The completion method according to claim 3, wherein the anti-channeling pack-off particles are spherical particles.

5. A production method comprising steps of:
   drilling a hole in a formation, the hole including a production section;

installing a flow-control filter string into the production section of the hole, the flow-control filter string being a filter that includes a flow regulating and controlling device;

filling an annulus radially exterior to the flow-control filter string with anti-channeling pack-off particles, the annulus being located between an outer wall of the flow-control filter string and a wall of an oil-gas well; and producing or injecting fluid in a completion that is formed, wherein, when the flow-control filter string is used to control a flow of a formation fluid or an injection fluid, the anti-channeling pack-off particles permit the formation fluid or the injection fluid to flow radially along the oil-gas well while limiting an axial flow of the formation fluid or the injection fluid along the oil-gas well, and wherein the anti-channeling pack-off particles are styrene and divinylbenzene cross-linked copolymer particles, which have an average particle diameter of 0.05-1.0 mm and a real density of 0.96-1.06 $g/cm^3$.

6. The production method according to claim 5, wherein the anti-channeling pack-off particles are spherical particles.

* * * * *